(12) United States Patent
Ali et al.

(10) Patent No.: US 10,412,152 B2
(45) Date of Patent: *Sep. 10, 2019

(54) SURGICAL CORRUPTION REPAIR IN LARGE FILE SYSTEMS

(71) Applicant: International Business Machines Corporation, Armonk, NY (US)

(72) Inventors: Asmahan A. Ali, Highland, NY (US); Ali Y. Duale, Poughkeepsie, NY (US); Mustafa Y. Mah, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 655 days.

This patent is subject to a terminal disclaimer.

(21) Appl. No.: 14/951,088

(22) Filed: Nov. 24, 2015

(65) Prior Publication Data
US 2017/0147626 A1    May 25, 2017

(51) Int. Cl.
*H04L 29/08* (2006.01)
*G06F 16/11* (2019.01)
*G06F 11/07* (2006.01)
*H04L 29/14* (2006.01)

(52) U.S. Cl.
CPC .............. *H04L 67/10* (2013.01); *G06F 11/07* (2013.01); *G06F 16/11* (2019.01); *H04L 69/40* (2013.01)

(58) Field of Classification Search
CPC ......... G06F 17/30067; G06F 17/30008; G06F 17/30887; G06F 17/30893; G06F 8/20; G06F 16/11; G06F 11/07; H04L 67/10; H04L 69/40

USPC .......................................................... 707/691
See application file for complete search history.

(56) References Cited

U.S. PATENT DOCUMENTS

| 7,523,343 B2 * | 4/2009 | Leis .................... G06F 11/0727 714/5.11 |
| 2012/0117035 A1 | 5/2012 | Ranade et al. |
| 2014/0052706 A1 | 2/2014 | Misra et al. |
| 2014/0201163 A1 * | 7/2014 | Tipton ................ G06F 11/1004 707/686 |

OTHER PUBLICATIONS

Anonymously ;"Stable File System"; IP.Com No. 000204595; Mar. 6, 2011; pp. 9.
Ao, M. et al.; "Ffsck: The Fast File-System Checker"; Backup recovery Systems Division, EMC; AN-14799385; 2014; pp. 38.
D. Ranade, et al.; "Corruption Tolerant File System"; IP.Com 000209510; Aug. 8, 2011; pp. 5.
(Continued)

*Primary Examiner* — Michael Pham
(74) *Attorney, Agent, or Firm* — Cantor Colburn LLP; Teddi Maranzano

(57) ABSTRACT

The described herein relates to repairing a file system. Repairing the file system includes identifying a corrupted node of a tree corresponding to the file system and determining a status of a parent node of the corrupted node based on a status bit of the parent node. Repairing the file system also includes disabling the parent node to an off-line mode when the status bit indicates that the parent node is in an on-line mode; fixing the corrupted node while the parent node is in the off-line mode; and enabling the parent node to the on-line mode in response to fixing the at least one corrupted node.

13 Claims, 6 Drawing Sheets

Process Flow 400

(56) References Cited

OTHER PUBLICATIONS

IBM et al.; "Memory Corruption Debugging System"; IP.com No. 000114706; Mar. 29, 2005 pp. 7.
List of IBM Patents or Patent Applications Treated as Related; (Appendix P), Date Filed Jun. 8, 2016 2 pages.
U.S. Appl. No. 15/176,398, filed Jun. 8, 2016; Entitled: Surgical Corruption Repair in Large File Systems.

* cited by examiner

SURGICAL CORRUPTION REPAIR IN LARGE FILE SYSTEMS

BACKGROUND

The present disclosure relates generally to repairing large file systems, and more specifically, to a surgical mechanism for repairing corrupted files in large file systems.

The exponential growth of data volumes leads to large and ever growing file systems to host the data volumes. High availability of data volumes is crucial to customers to drive important business decisions. Unfortunately, these large and ever growing file systems are occasionally subject to corruption.

The impact of such corruptions ranges from affecting an entire file system to a single file and/or directory. Corruptions to any file system needs to be identified and corrected. Contemporary corrective actions run system checks to report and fix corruptions. These system checks require taking the entire file system off-line, which affects many users for unpredictable time periods. At present, there are no contemporary corrective actions that enable repair the entire file system that stripes data over storage without taking the entire file system down first.

SUMMARY

Embodiments herein include a method, system, and computer program product for repairing a file system. Repairing the file system includes identifying a corrupted node of a tree corresponding to the file system; determining a status of a parent node of the corrupted node based on a status bit of the parent node; disabling the parent node to an off-line mode when the status bit indicates that the parent node is in an on-line mode; fixing the corrupted node while the parent node is in the off-line mode; and enabling the parent node to the on-line mode in response to fixing the at least one corrupted node.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter described herein is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
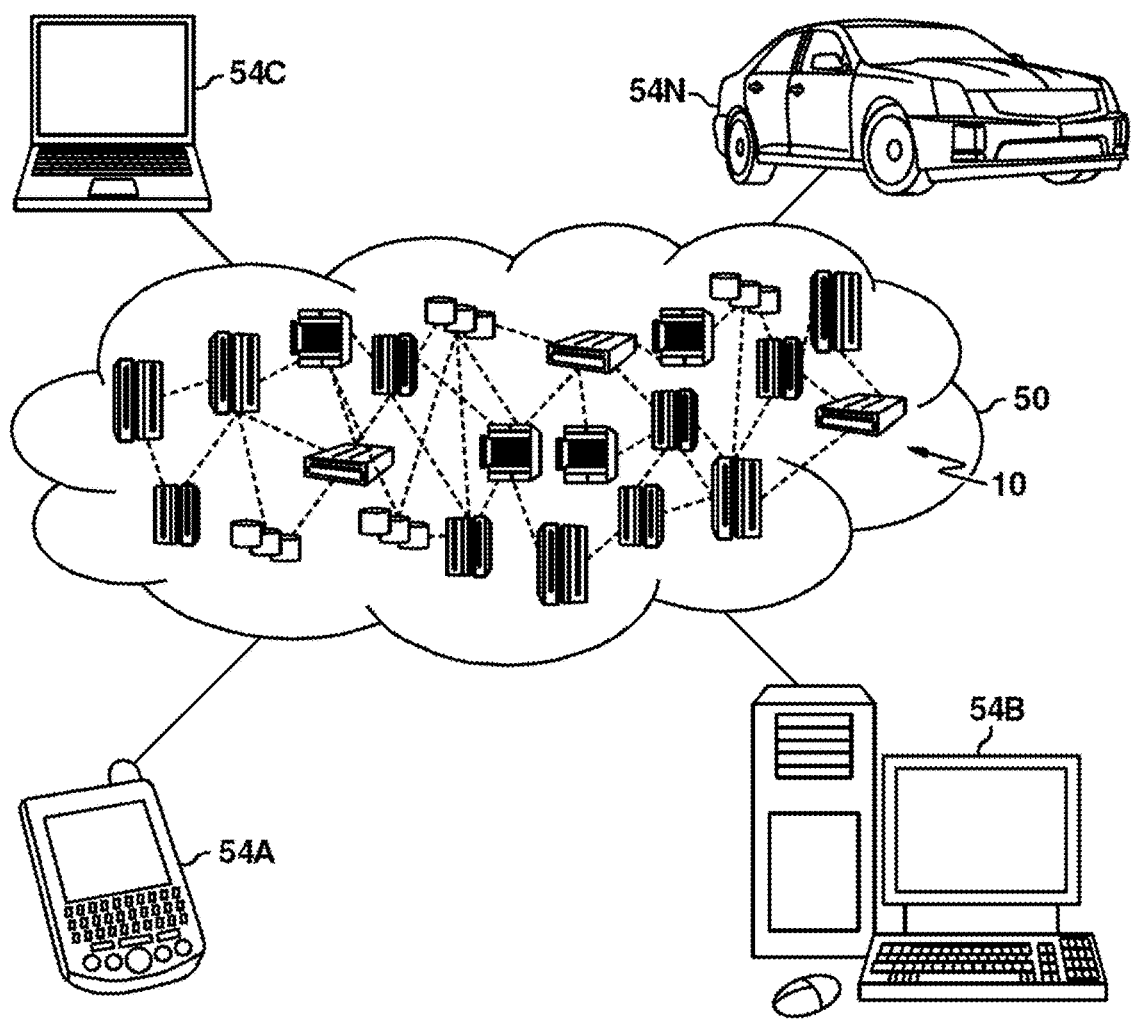
FIG. 1 depicts a cloud computing environment according to an embodiment.

Embodiments described herein relate to a surgical mechanism for repairing corrupted files in a file system that enables corrective actions without taking the file system down. For instance, embodiments herein avoid taking the file system down while running file system integrity check (fsck) when corruptions are limited to known files. In this way, embodiments herein prevent unnecessary down time of the entire file system.

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
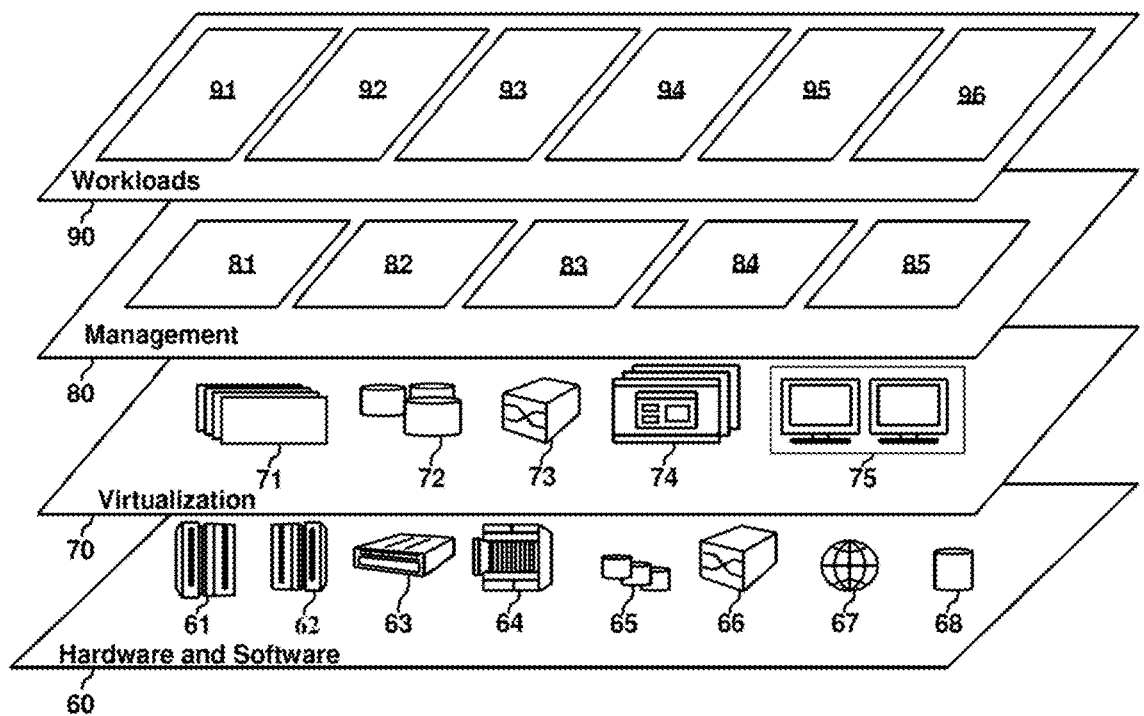
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments herein are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In view of the above, example embodiments of the surgical mechanism will now be described. In one example, if one single file is bad, a surgical mechanism can 'off-line' a parent directory of the single file, which will prevent access to a branch of a file system corresponding to that parent directory. Then, the surgical mechanism executes an fsck on the off-line parent directory, while a main community remains on-line and utilizing portions of the file system that do not include the off-line parent directory. Once the fsck addresses all issues with the single file, the surgical mechanism can 'on-line' the parent directory.

To perform the above, each directory of the file system utilizes a status bit that indicates whether the directory is on-line or off-line. If the status bit that indicates a corresponding directory is on-line, the file system is allowing access to files of that directory. If the status bit that indicates a corresponding is off-line, the file system is not allowing access to files of that directory and thereby prevents read/write operations to those files, along with fsck maintenance to take place. Note that because fsck is a delicate operation related to metadata of the file system, an integrity check cannot be performed on files while external input/output (I/O) operations from the fsck perspective are going to and from those files (otherwise more problems can arise).

Figure 3:
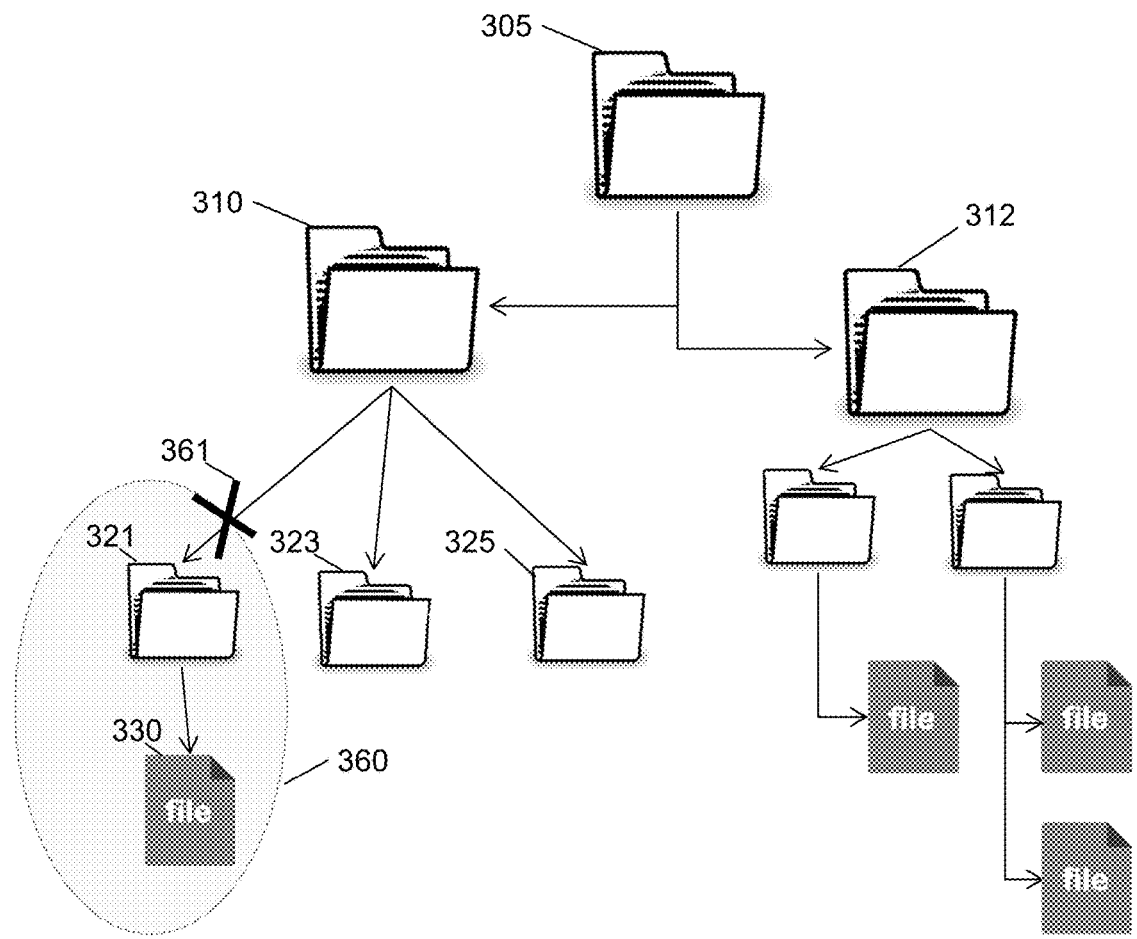
FIG. 3 depicts a file system receiving a surgical fix in accordance with an embodiment.

Turning now to FIG. 3, a file system 300 is generally shown in accordance with an embodiment. In general, the file system 300 includes a plurality of directories arranged in a tree. A directory is a cataloging structure at a root position that contains references to files and other directories. Any directory can be a root or parent node with sub- or child nodes stemming therefrom. A reference is a value that enables a computer program to indirectly access a particular datum, such as a file, a variable, or a record, in memory or other storage. Note that arrows between the nodes of the tree indicate these references. A file is a resource for storing information, which can be available to a computer program.

As shown in FIG. 3, a root directory 305 includes at least one sub-directory and/or file, such as subdirectories 310, 312. The sub-directories 310, 312 can be the root nodes for additional sub-directories or files. For example, on the left-side of the tree, the sub-directory 310 includes at least at least one sub-directory and/or file, such as subdirectories 321, 323, and 325. Each one of these sub-directories 321, 323, and 325 can contain files and/or other directories. As shown, sub-directory 321 includes a file 330. Note that the file system 300 is an example file system and is not limiting.

Further, a management system implementing a surgical mechanism can be configured to generate a tree for managing the file system 300, as shown in FIG. 3. The management system can be configured to map a physical disk failure to metadata or the file system 300 (and files therein) to correctly identify a portion of the tree that needs to be under repair.

For example, when the file 330 is a corrupted file, the management system can divide the file system 300 into usable sub-trees and 'under repair' sub-trees (e.g., a sub-tree as denoted by circle 360) to allow use of the uncorrupted data while the error is corrected within the file 330. By disabling the sub-tree as denoted by circle 360, the entire file system 300 does not have to be taken off-line to fix the file 330. Rather, the parent directory 321 of the file 330 can be taken off-line (e.g., as denoted X 361 between directories 310 and 321) to fix the file 330 while the rest of the file system 300 remains on-line.

The management system can also be configured to implement a sliding maintenance window of data in the file system 300, such that preventative maintenance can be applied to any sub-tree of the file system 300 while a remaining portion of the file system 300 stays in operation.

Figure 4:
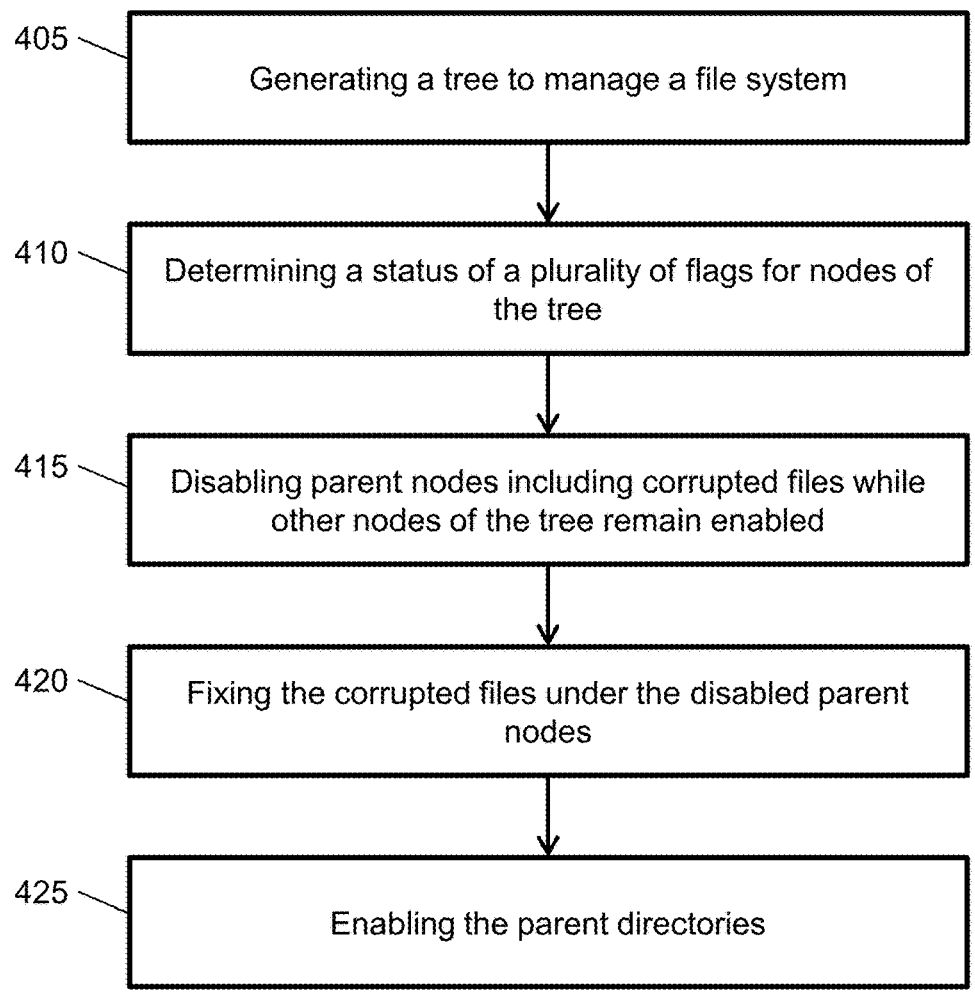
FIG. 4 depicts a process flow for executing a surgical fix in accordance with an embodiment.

FIG. 3 will now be described with reference to FIG. 4. FIG. 4 depicts a process flow 400 for executing a surgical fix within the file system 300 in accordance with an embodiment.

The process flow 400 begins at block 405, where the management system generates a tree to manage the file system 300. Each node structure of the tree (herein referred to as an node) includes a flag. This flag (e.g., a status bit, isonline_flag, isoffline_flag, etc.) identifies if a corresponding node is on-line or off-line. A node that is in on-line mode can accept input/output (I/O) and is user accessible. A node that is in off-line mode can't accept I/O and is not user accessible. An example of a node is an inode, which is a data structure used to represent a filesystem object that can be one of various things including a file or a directory. When in on-line mode, e.g., the flag can be set to 1 or 0. When in off-line mode, e.g., the flag can be set an opposite value of the on-line mode value. The isonline_flag can be set for each node, according to that node's availability, during generation of the tree. The isonline flag can also be maintained in real-time by the management system.

At block 410, the management system determines a status of a plurality of flags for the nodes of the tree. To determine a status, the management system can perform fsck of the isonline_flags of the tree. The fsck can be directed to start from an arbitrary directory/node rather than the entire file system. If a corrupted file is found (e.g., when the file 330 is a corrupted file), the process flow 400 proceeds to block 415.

At block 415, the management system disables parent nodes including corrupted files while other nodes of the tree remain enabled. For instance, a parent directory of the corrupted file (e.g., directory 321) is taken offline (e.g., as indicated by the X 361 and circle 360). That is, the entire file system 300 does not need to be taken offline to fix it. Instead, only affected nodes are taken off-line.

Once a node is put into off-line mode, the process flow proceeds to block 420, where the management system fixes the corrupted files under the disabled parent nodes. In this way, the management system can repair, disable, and/or delete (whether permanent or otherwise) the corrupted file while having the rest of file system 300 online. For instance, intrusive operations of the fsck can work on or repair the file 330 while allowing accessibility of healthy nodes (e.g., remaining directories 312, 323, 325). The fsck can be a process run by the file system daemon that fixes metadata damage associated with the tree structure starting from the off-line file 330. Once the node is fixed, the process flow proceeds to block 425, where the parent directory (e.g., directory 321) is put back online.

Figure 5:
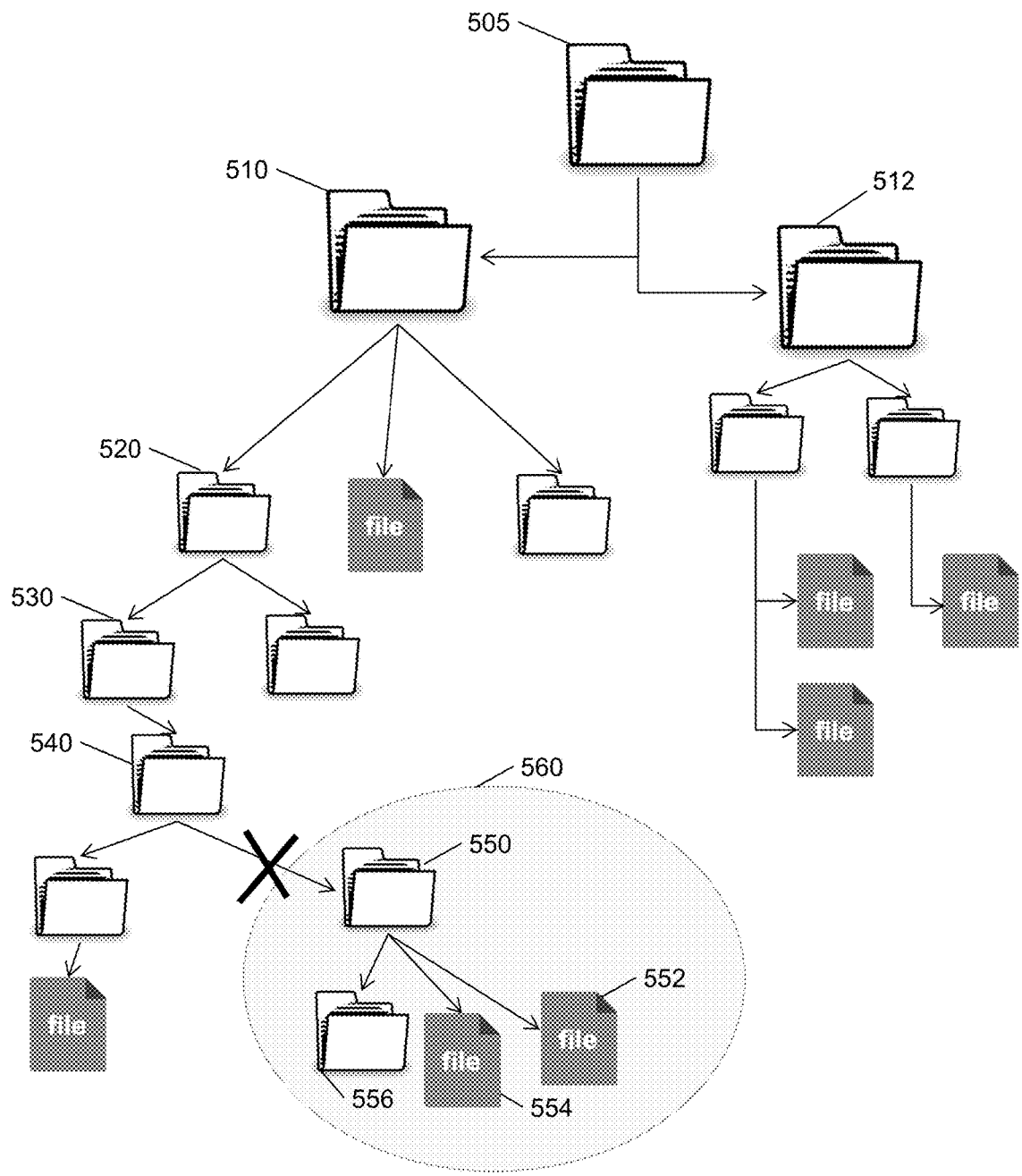
FIG. 5 depicts another file system receiving a surgical fix in accordance with an embodiment.

Turning now to FIG. 5, a file system 500 is generally shown in accordance with an embodiment. As shown in FIG. 5, a root directory 505 includes at least one sub directory and/or file, such as sub-directories 510, 512. The sub-directories 510, 512 are the root nodes for additional sub-directories or files. For example, on the left-side of the tree, the sub-directory 510 includes at least one sub-directory and/or file, such as sub-directory 520. The sub-directory 520 includes at least one sub-directory and/or file, such as sub-directory 530. The sub-directory 530 includes at least one sub-directory and/or file, such as sub-directory 540. The sub-directory 540 includes at least one sub-directory and/or file, such as sub-directory 550. The sub-directory 550 can contain files or other directories, such as file 552, file 554, and sub-directory 556. Note that the file system 500 is an example file system and is not limiting.

The file 552 and the directory 556 are corrupted. By utilizing the surgical mechanism, the entire file system 500 does not have to be taken off-line to fix the file 552 and the directory 556. Rather, the parent directory 550 can be taken off-line (as denoted by circle 560) to fix the file 552 and the directory 556 while the rest of the file system 500 remains on-line.

Figure 6:
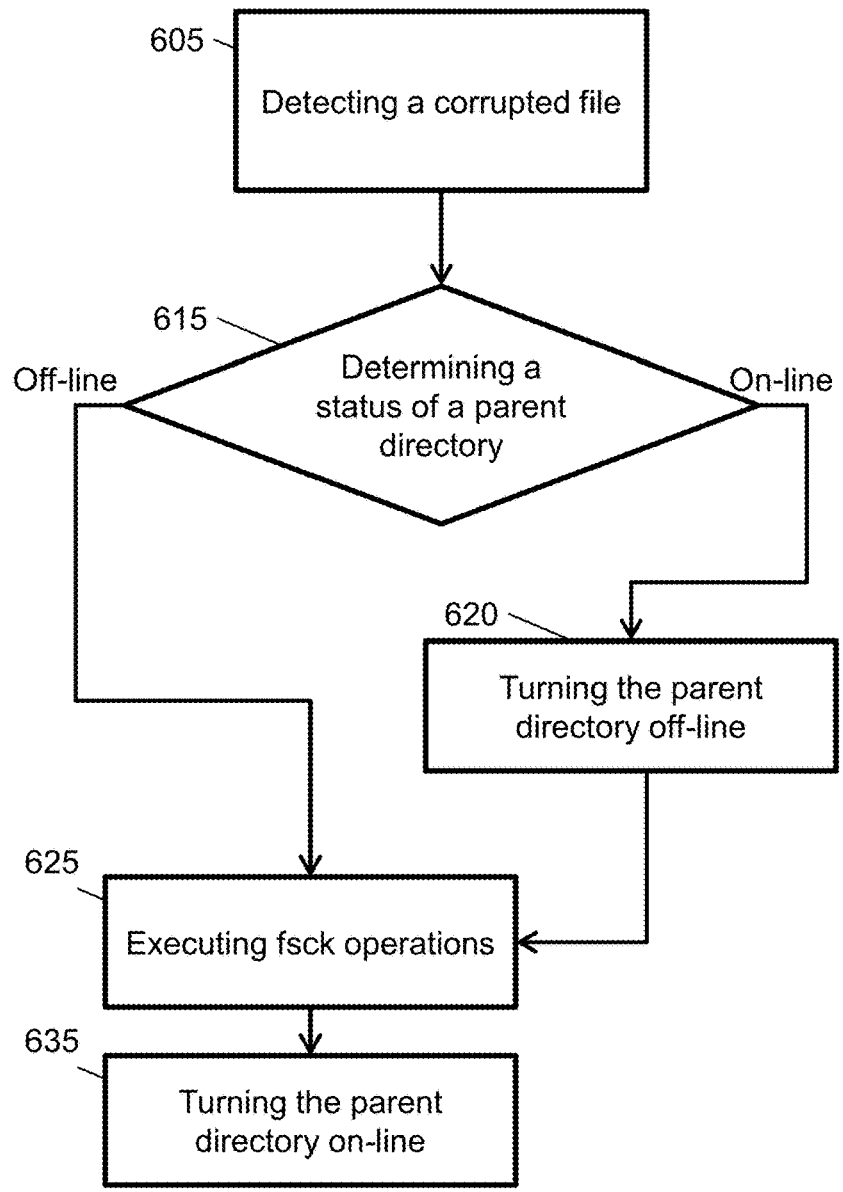
FIG. 6 depicts another process flow for executing a surgical fix in accordance with an embodiment.

FIG. 5 will now be described with reference to FIG. 6. FIG. 6 depicts a process flow 600 for executing a surgical fix within the file system 600 in accordance with an embodiment.

The process flow 600 begins at block 605, where a corrupted file is detected. At decision block 615, a status determination of a parent directory of the corrupted file is performed. A status bit of the parent directory is checked. If the status bit indicates that the parent directory is on-line (e.g. the offline_flag is off) for a parent directory of the corrupted file, the process flow proceeds to block 620. If the status bit indicates that the parent directory is off-line (e.g. the offline_flag is on) for the parent directory of the corrupted file, the process flow proceeds directly to block 625. Note that the default for the offline flag can be off, which is an on-line indication.

At block 620, the parent directory is turned off-line. To turn the parent directly off-line, the status bit can be adjusted to indicate that the parent directory is off-line (e.g. the offline_flag is on). When the offline flag is on, user I/O is prevented to and from the corresponding directory. For example, a process (i.e. file system daemon) controlling the I/O to and from a parent directory can prevent that I/O when the offline_flag of that parent directory is on. fsck I/O will be allowed to fix the inconsistency.

Next, the process flow proceeds to block 625. At block 625, fsck operations are executed. At block 635, the parent directory is turned on-line. To turn the parent directly on-line, the status bit can be adjusted to indicate that the parent directory is on-line (e.g. the offline_flag is off). Note that the parent directory is turned on-line once fsck operations are complete.

In view of the above, when corruption affects multiple nodes in different directory sub-trees, an order of fixing these nodes can vary based on the priorities (e.g., that can be set by a user or a system administrator). For example, the priorities can include: taking critical nodes off-line to fix first while having the rest of the file system online; fixing at a later time nodes that are not badly corrupted and are running long batch jobs; fixing the highest node in the hierarchy structure of the corrupted tree first in the event that all corrupted nodes have the same priority; and/or taking only corrupted sub-file system off-line to minimize down time, file system loss, and user dissatisfaction.

Technical effects and benefits of embodiments herein include eliminating the need to take an entire file system offline. Thus, embodiments described herein are necessarily rooted in management system to perform proactive operations to overcome problems specifically arising in the realm of repairing large file systems (e.g., these problems include the taking down of entire file systems to fix a single file and/or directory, resulting in unwanted costs and expenses due to lose productivity).

The embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising a computer readable storage medium having program instructions for repairing a file system embodied therewith, the program instructions executable by a processor to cause the processor to perform:
    identifying a corrupted node of a tree corresponding to the file system;
    determining a status of a parent node of the corrupted node based on a status bit of the parent node;
    disabling the parent node to an off-line mode when the status bit indicates that the parent node is in an on-line mode,
    fixing the corrupted node while the parent node is in the off-line mode; and enabling the parent node to the on-line mode in response to fixing the corrupted node.

2. The computer program product of claim 1, wherein the fixing of the corrupted node includes executing a file system integrity check.

3. The computer program product of claim 2, wherein the file system integrity check is a file system daemon that fixes metadata damage associated with a sub-tree starting from the corrupted node.

4. The computer program product of claim 2, wherein the file system integrity check repairs, permanently disables, or deletes the corrupted node.

5. The computer program product of claim 1, wherein the disabling of the parent node enables remaining portions of the file system to be in the on-line mode while the fixing of the corrupted node is performed.

6. The computer program product of claim 1, wherein when the parent node is in the on-line mode, the parent node is able to accept user input/output, and wherein when the parent node is in the off-line mode, the parent node is not able to accept user input/output.

7. The computer program product of claim 1, the program instructions further executable by the processor to cause the processor to perform generating the tree to manage the file system.

8. A system for repairing a file system, comprising:
    a memory having computer readable instructions; and
    a processor for executing the computer readable instructions, the computer readable instructions including instructions for:
    identifying a corrupted node of a tree corresponding to the file system;
    determining a status of a parent node of the corrupted node based on a status bit of the parent node;
    disabling the parent node to an off-line mode when the status bit indicates that the parent node is in an on-line mode:
    fixing the corrupted node while the parent node is in the off-line mode; and
    enabling the parent node to the on-line mode in response to fixing the corrupted node.

9. The system of claim 8, wherein the fixing of the corrupted node includes executing a file system integrity check.

10. The system of claim 9, wherein the file system integrity check is a file system daemon that fixes metadata damage associated with a sub-tree starting from the corrupted node.

11. The system of claim 9, wherein the file system integrity check repairs, permanently disables, or deletes the corrupted node.

12. The system of claim 8, wherein the disabling of the parent node enables remaining portions of the file system to be in the on-line mode while the fixing of the corrupted node is performed.

13. The system of claim 8, wherein when the parent node is in the on- line mode, the parent node is able to accept user input/output, and wherein when the parent node is in the off-line mode, the parent node is not able to accept user input/output.

* * * * *